Figure 1:
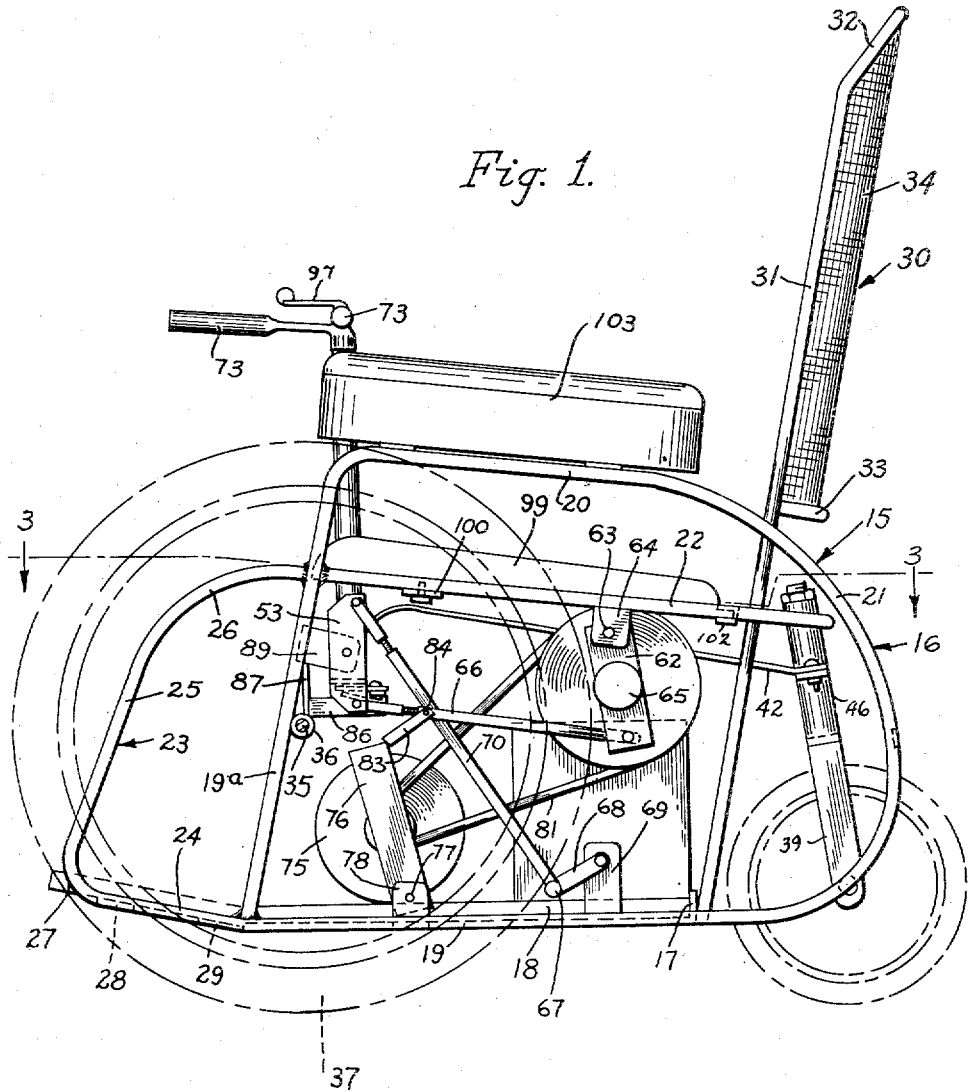

Sept. 4, 1951 K. GINSTERBLUM 2,567,065
WHEEL CHAIR STEERING AND DRIVE CONTROL
Filed Oct. 21, 1946 5 Sheets-Sheet 2

Inventor
KENNETH GINSTERBLUM
By Kimmel & Crowell
Attorneys

Sept. 4, 1951  K. GINSTERBLUM  2,567,065
WHEEL CHAIR STEERING AND DRIVE CONTROL
Filed Oct. 21, 1946  5 Sheets-Sheet 3

Inventor
KENNETH GINSTERBLUM
By Kimmel & Crowell
Attorneys

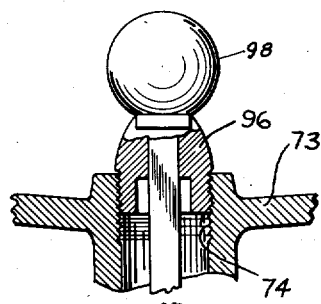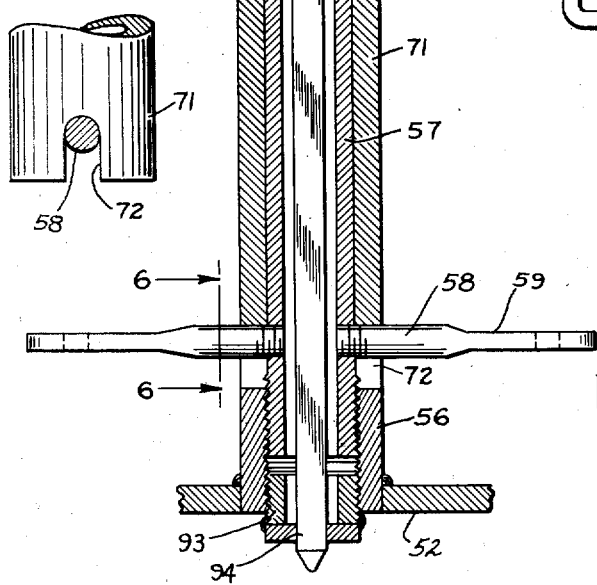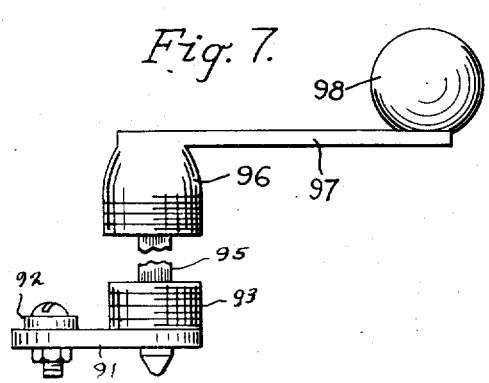

Sept. 4, 1951 K. GINSTERBLUM 2,567,065
WHEEL CHAIR STEERING AND DRIVE CONTROL
Filed Oct. 21, 1946 5 Sheets-Sheet 5
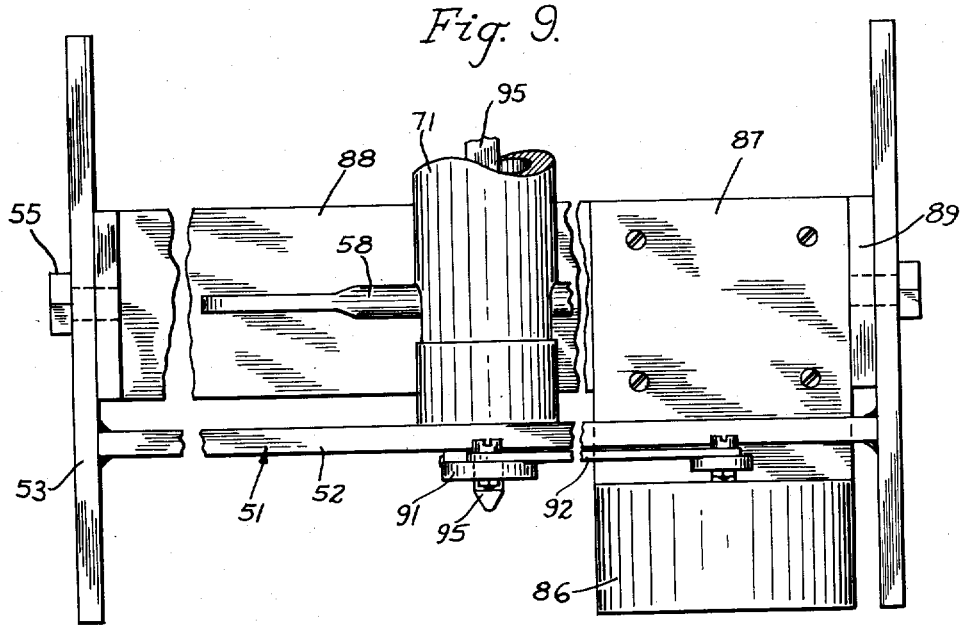
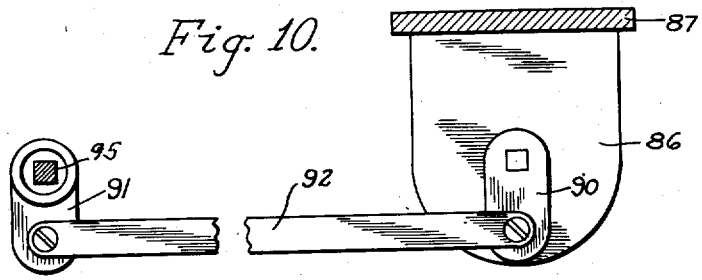
Inventor
KENNETH GINSTERBLUM
By Kimmel & Crowell
Attorneys

Patented Sept. 4, 1951

2,567,065

UNITED STATES PATENT OFFICE 2,567,065

WHEEL CHAIR STEERING AND DRIVE CONTROL

Kenneth Ginsterblum, Osage, Iowa

Application October 21, 1946, Serial No. 704,681

11 Claims. (Cl. 180—27)

This invention relates to power driven invalid chairs.

An object of this invention is to provide an improved invalid chair of the power driven type which can be used either indoors or outdoors, and which includes an improved centrally disposed means for regulating the operation of the chair so that an invalid will be able to properly control the movement of the chair without undue strain.

Another object of this invention is to provide an improved invalid chair of this type wherein the controls for the movement of the chair are all centered on the steering mechanism.

Another object of this invention is to provide an invalid chair which includes a rockable control column support, the support upon rocking in one direction being adapted to bring the driving wheels into operative engagement with the traction wheels, and the support upon rocking in the opposite direction being adapted to bring a braking means into operative engagement with the traction wheels.

A further object of this invention is to provide a wheel chair of the power driven type which may be used either as a power driven chair, or if desired, the controls may be removed by merely lifting out the control column and the chair used as a normal wheel chair which may be pushed by an attendant.

With the above and other objects in view, my invention consists in the arrangement, combination and details of construction disclosed in the drawings and specification, and then more particularly pointed out in the appended claims.

Figure 2:
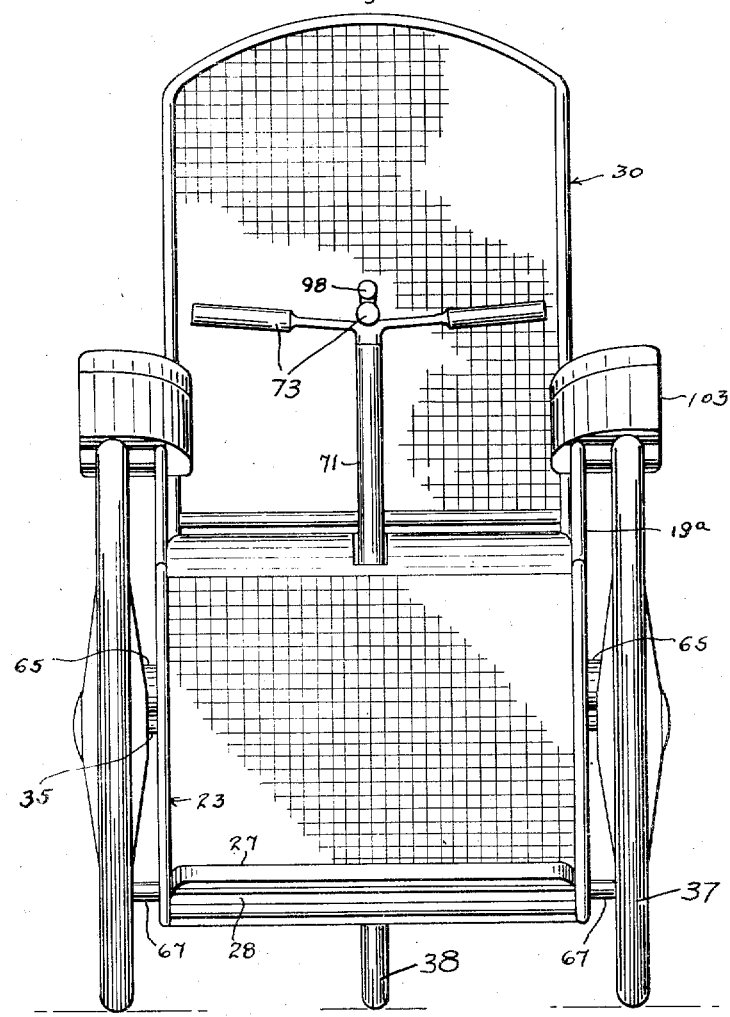
Figure 12:
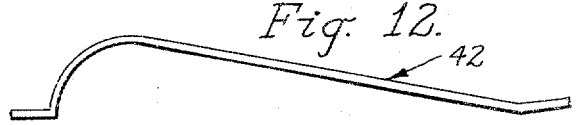
Figure 3:
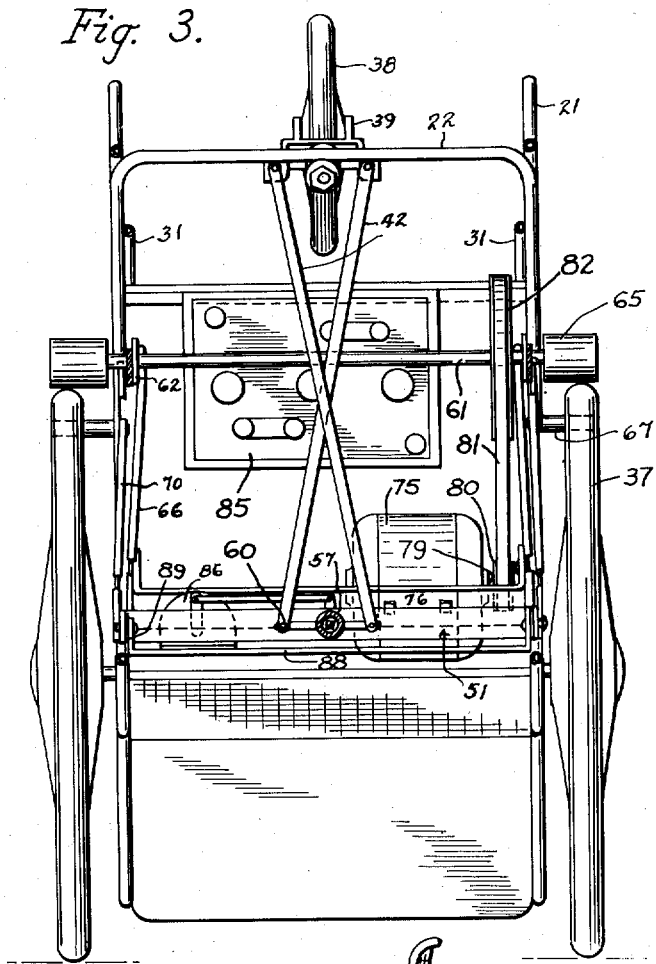
Figure 4:
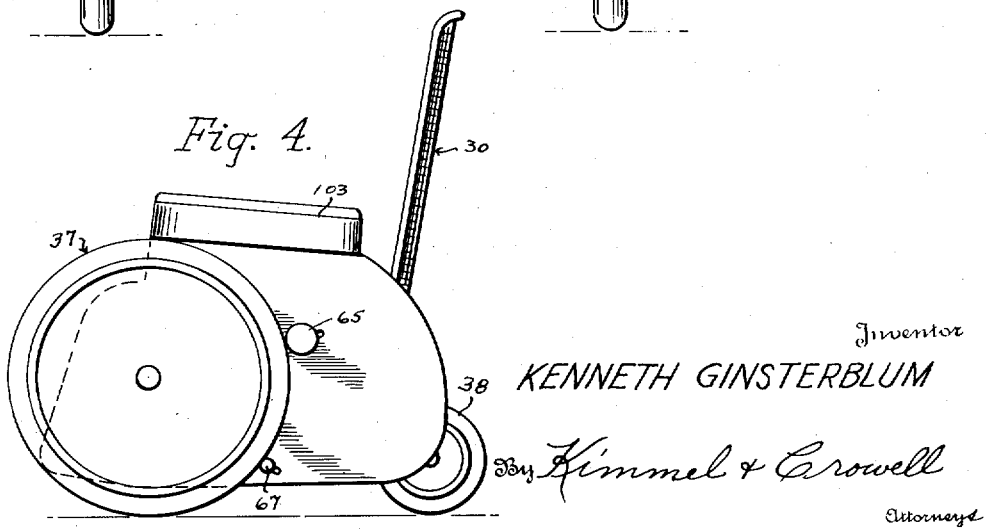

In the drawings,

Figure 1 is a detail side elevation of a power driven wheel chair constructed according to an embodiment of this invention, Figure 2 is a detail front elevation of the chair, Figure 3 is a sectional view taken on the line 3—3 of Figure 1, Figure 4 is a detail side elevation of the chair with the control means removed for using the chair as an ordinary wheel chair, Figure 5 is a fragmentary vertical section of the combined control column and control means, Figure 6 is a fragmentary sectional view taken on the line 6—6 of Figure 5, Figure 7 is a detail side elevation of the switch regulator removed from the control column, Figure 8 is a fragmentary detail rear elevation of the rear wheel construction, Figure 9 is a detail front elevation, partly broken away, of the control column mounting and regulating means for the driving means, Figure 10 is a horizontal section, partly broken away, of the switch regulator, Figure 11 is a detail side elevation, partly broken away, and in section, of the seat, Figure 12 is a detail side elevation of one of the steering links, or levers.

Referring to the drawings, the numeral 15 designates generally a body member which is constructed of opposite side members 16 connected together at their lower ends by connecting means 17, and a bottom 18. The side members 16 include a bottom rail 19, an upwardly and rearwardly inclined front rail 19a, a top rail 20 which is inclined downwardly and rearwardly, and a rear rail 21 which is longitudinal arcuate configuration and merges at its lower end with the rear end of the bottom rail 19.

An intermediate seat supporting rail 22 of U-shape in plan is connected at the forward ends of the legs thereof to the upper portions of the front rails 19a and has the bight thereof rearwardly extending between the two side members 16. The body 15 also includes a foot supporting frame 23 which is formed of a lower rail 24 fixed at its rear end to the side members 16 and extending upwardly and forwardly therefrom. The foot supporting frame member 23 also includes an upwardly and rearwardly inclined forward rail 25 merging at its upper end in a longitudinally curved rail 26 which is fixed as by welding or the like to the upper portion of the front rail 19a.

A foot board 27 is adapted to be secured between the two lower rails 24 and preferably lower bars 28 and 29 are secured between the lower rails 24 and serve as a rest or support for the foot board 27. The body 15 has fixed thereto a back member generally designated as 30 which includes an upwardly and rearwardly inclined U-shaped frame 31 which is fixed to the side members 16 at the lower portions of the legs of the U-shaped member and the upper portion or bight of the back frame 31 is upwardly and rearwardly inclined as at 32.

An intermediate longitudinally curved back rest support 33 is secured to the inverted U-shaped member 31 between the ends of the legs thereof and a webbing or back rest 34 is secured between the rest supporting member 33 and the legs and bight of the U-shaped member 31. The frame 15 has extending across the forward portion thereof a shaft or axle 35 which is carried by bearings 36 fixed to the rear sides of the front rails 19a. The shaft 35 has journaled on the opposite ends thereof traction wheels 37. A rear steering wheel 38 is disposed at the rear of the frame 15 and is journaled between a pair of depending fork forming arms 39 which are fixed at their upper ends to a U-shaped member 40.

The U-shaped member 40 has outwardly extending upper ends 41 with which a pair of steering levers 42 are adapted to be pivotally connected as indicated at 43. The U-shaped member 40 has fixed to the bight 44 thereof an upwardly extending spindle 45 which is journaled in a bearing sleeve 46 which is fixed as by welding 47 or the like to the inside of the bight 48 of the U-shaped member 22. A spring 49 is interposed between the bight 44 of the U-shaped member 40 and the lower end of the bearing sleeve 46 so as to cushion the up and down movement of the spindle 45 in the bearing sleeve 46.

A nut 50 is threaded on the upper end of the spindle 45 for limiting the downward movement of the spindle in the sleeve 46. A rockable H-shaped member generally designated as 51 is disposed in the forward portion of the frame or body 15 and includes a horizontal bar 52 having fixed to the opposite ends thereof parallel upright lever bars 53.

The horizontal bar 52 has fixed in the transverse median thereof an internally threaded bushing 56 within which a steering post in the form of a tube 57 is threaded. The tube 57 has threaded into diametrically opposed points thereof a pair of steering arms 58 which are flattened at their outer ends as indicated at 59 and the forward ends of the steering levers or links 42 are pivotally secured to the arms 59 as indicated at 60.

The levers or links 42, as shown in Figure 12, are of longitudinal bowed configuration and are also resilient so that the steering frame comprising the H-member 51 may rock about the horizontal pivot members 55. A driving shaft 61 is journaled through a pair of depending rockable plates 62 which are pivotally carried by pivot members 63 extending through supporting plates 64 which are fixed to the U-shaped member 22 between the ends of the parallel legs thereof. The shaft 61 has fixed on the opposite ends thereof friction driving members 65 which upon forward swinging of the levers or plates 62 are adapted to frictionally connect with the periphery of the wheels 37 so as to thereby rotate these wheels and move the chair over a plane surface.

The lever members 53 are connected to the levers 62 by means of extensible links 66, the links 66 being connected to the lower portions of the levers 53 and the levers 62, as shown in Figure 1. In this manner when the levers 53 are rocked forwardly at their lower ends, the levers 62 will be pulled forwardly so as to engage the driving pulleys 65 with the traction wheels 37. A pair of brake members 67 are carried by rock levers 68 which are supported by upstanding members 69 fixed to the lower rails 19.

The brake members 67 are disposed below the driving members 65 and are adapted when in braking position to contact with the periphery of the wheels 37. The rock levers 68 are connected to the upper portions of the levers 53 by means of extensible links 70. In this manner when the levers 53 are rocked forwardly at their lower ends, the brake members 67 will be moved downwardly and rearwardly to disengaged position by rearward rocking of the upper portions of the levers 53. When the levers 53 are rocked forwardly at their upper ends thereby swinging the driving members 65 to disengaged position, the brake members 67 will be moved upwardly into contact with the wheels 37 by forward rocking of the upper portions of the levers 53.

A removable control column 71 is adapted to telescope over the steering post comprising the column or tube 57 and is formed at its lower end with notches or slots 72 whereby the lower end of the column 71 will engage the upper end of the bushing 56 and the steering arms 58 will extend through the slots 72. In this manner rotation or turning of the control column 71 will rotate the tube 57 which is loosely threaded into the bushing 56. The upper end of the control column 71 has extending therefrom three steering arms 73 and the column 71 is internally threaded as at 74.

A motor or power member 75 is rockably supported in the body 15. The motor 75 is fixed to an inverted U-shaped rockable frame 76 which is rockably mounted on pivot members 77 extending through upstanding plates or support members 78 which are fixed to the bottom rails 19. The motor 75 has mounted on the motor shaft 79 thereof, a pulley 80 about which a belt 81 is trained. The shaft 61 has a large pulley 82 fixed thereto about which the belt 81 is trained. In order to provide for maintaining the belt 81 tight, I have provided belt tensioning bars 83 which are pivotally secured as at 84 to the forward portions of the links 66. The bars 83 are adapted to engage the motor supporting frame 76 so that this frame will be rocked forwardly at the same time that the drive shaft 61 is swung forwardly.

The motor 75 is preferably an electric motor and is connected by means of the usual conductors to a battery or supply source 85 which is mounted on the rear portion of the platform or floor 18. In order to provide for the convenient operation of the motor 75, I have provided a switch 86 which is mounted on a plate 87. The plate 87 is secured to the rear side of an elongated bar 88 fixed between front bars 19a and formed with rearwardly extending arms 89 through which pivot members 55 extend.

The switch 86 includes a switch arm 90 extending rearwardly therefrom which is connected to a switch operating lever 91 by means of a link 92. The arm or lever 91 is secured to a threaded bushing 93 loosely threaded into the lower end of the bushing 56 and the arm 91 is formed with a polygonal opening 94. An elongated rod 95 extends through the center of the column 71 and is adapted to extend through the tube 57 and removably engage in the polygonal opening 94. The upper end of the rod 95 is fixed to a nut 96 loosely threaded into the internal threads 74.

A lever 97 is fixed to the nut 96, extending laterally therefrom and has a knob 98 fixed thereto so that swinging of the lever 97 will effect either opening or closing of the switch 86. Inasmuch as the nut 96 and the bushing 93 are loosely threaded relative to the control column, the control column can rotate without movement of the switch operating rod 95. A seat 99 is disposed between the sides 16 of the body 15 and is supported at its forward portion on a transversely extending support bar 100. The rear portion of the seat 99 is formed with a flange 101 engaging within the channel of a channel member 102 which is fixed between the legs of the U-shaped member 22. The seat 99 is readily removable to provide access to the motor, battery and other parts therebelow.

The opposite ends of the forward bar 100 are also fixed between the legs of the U-shaped member 22. It will be understood that the frame or body 15 may be covered with any suitable material which may be fabric, leather, or metal so as to completely enclose the frame or body.

The upper rails 20 of the side members 16 constitute supporting means for arm rests 103 which are fixed to the rails as shown in Figure 1.

In the use and operation of this chair, when it is desired to have the chair move by means of the power member 75, the switch 86 is closed and the person seated in the chair may effect forward movement by swinging the upper end of the control column rearwardly thereby pulling the driving members 65 forwardly into engagement with the wheels 37. The speed of movement of the vehicle can be finally regulated by means of the pressure exerted from the rearward pull of the control column which will in turn provide for the frictional contact between the driving wheels 65 and the traction wheels 37. When it is desired to stop the movement of the chair, the control column is rocked forwardly, thereby moving the driving wheels 65 to disengaged position, and if the control column is moved forward a sufficient degree, the brake members 67 will be pulled upwardly to wheel engaging position.

In the event it is desired to use this chair without the power driven feature, the control column can be withdrawn and the chair pushed in the usual manner. The wheel 38 which is the rear wheel will readily turn with the control column removed, thereby permitting the free turning of the chair when the control column is removed.

I do not mean to confine myself to the exact details of construction herein disclosed, but claim all variations falling within the purview of the appended claims.

What I claim is:

1. A power driven wheel chair comprising a chair body, traction wheels mounted on said body, a power unit mounted on said body, a rotatable driving member pivotally mounted on said body and operably connected to said power unit, a brake member pivotally mounted adjacent one of said wheels, control means pivotally mounted on said body and adapted to be rocked about its pivot point for engaging either of said driving and brake members with one of said traction wheels, a link member connecting said driving member with said control means at one side of said pivot point, and a second link member connecting said brake member with said control means at the opposite side of said pivot point.

2. A power driven wheel chair comprising a chair body, traction wheels mounted on said body, a power unit mounted on said body, driving structure comprising a drive shaft and pulley swingably mounted on said body and operably connected to said power unit, friction drive members disposed on opposite ends of said drive shaft and adapted to engage said traction wheels, brake members swingably mounted adjacent wheels for braking engagement therewith, a supporting frame pivotally mounted at its central portion on said body for rocking movement about a horizontal axis, an upright control column carried by said frame, and connecting linkages affixed to said frame above and below said axis and connecting said frame with said driving structure and said brake members, whereby rocking movement of said control column and frame in one direction causes said drive members to engage said traction wheels and said brake members to disengage said wheels and whereby rocking movement of said column and frame in the opposite direction causes said brake members to engage said wheels and said drive members to disengage said wheels.

3. A power driven wheel chair comprising a chair body, traction wheels mounted on said body, a power unit swingably supported on said body, driving structure swingably mounted on said body and comprising a drive shaft having friction drive members disposed at opposite ends thereof and a drive pulley mounted on said shaft, belt means operably connecting said power unit with said pulley, brake members swingably mounted adjacent said traction wheels for braking engagement therewith, rockable control means pivotally mounted on said body, connecting linkages extending from said control means to said driving structure and to said brake members for engaging and disengaging said drive and brake members with said traction wheels by rocking movement of said control means, and a belt tensioning member movable in conjunction with said swingably mounted driving structure and adapted to engage said swingably supported power unit for maintaining said belt means under proper driving tension when said drive members are moved into engagement with said traction wheels.

4. A power driven wheel chair comprising a chair body, traction wheels mounted on said body, a power unit swingably supported on said body, driving structure swingably mounted on said body and comprising a drive shaft having friction drive members disposed at opposite ends thereof and a drive pulley mounted on said shaft, belt means operably connecting said power unit with said pulley, brake members swingably mounted on said body, rockable control means pivotally mounted on said body, a link member operably connecting said control means with said driving structure for engaging said drive members with said traction wheels upon rocking movement of said control means in one direction and for disengaging said drive members upon rocking movement of said control means in the opposite direction, a second link member operably connecting said control means with said brake members for engaging the latter with said traction wheels upon rocking movement of said control means in said opposite direction and for disengaging said brake members upon rocking movement of said control means in said one direction, and a belt tensioning bar adapted to engage said swigably supported power unit and connected to said first mentioned link member whereby movement of said driving structure into wheel engaging position causes simultaneous movement of said power unit for maintaining said belt means under proper driving tension.

5. In a power driven wheel chair having a chair body with traction wheels and a steering wheel mounted thereon, the combination of pivotally supported driving means for said traction wheels and rockably mounted control structure operably connected to said driving means for positioning the latter in and out of driving relation with said traction wheels, said structure comprising a rotatable steering post operably connected to said steering wheel and a detachable control column engaged in telescopic relation with said steering post.

6. In a power driven wheel chair having a chair body with traction wheels and a steering wheel mounted thereon, the combination of pivotally supported driving means for said traction wheels and a rockable control structure comprising a pivotally mounted supporting frame, connecting linkage between said frame and said driving means for positioning the latter in and out of driving relation with said traction wheels in response to rocking movement of said frame, an upright steering post rotatably mounted in said frame and operably connected to said steering wheel, and an upright control column telescopically engaged with said steering post, said control column being adapted to impart rotary movement to said steering post for steering the wheel chair and also adapted to impart rocking movement to said frame, and said control column being removable from said steering post for non-power driven use of the wheel chair.

7. In a power driven wheel chair having a chair body with traction wheels and a steering wheel mounted thereon, the combination of pivotally supported driving means for said traction wheels and a rockable control structure comprising a pivotally mounted supporting frame, connecting linkage between said frame and said driving means for positioning the latter in and out of driving relation with said traction wheels in response to rocking movement of said frame, an upright steering post rotatably mounted in said frame and having laterally projecting steering arms, connecting linkage between said arms and said steering wheel, and an upright control column telescopically fitted over said steering post and provided with slots at its lower end through which said steering arms project, said control column being telescopically detachable from said steering post for non-power driven operation of the wheel chair.

8. In a power driven wheel chair having a chair body, traction wheels, a steering wheel, swingable driving means adapted to be positioned in and out of driving relation with said traction wheels, and an electric motor operably connected to said driving means; a rockable control structure operably connected to said driving means, said structure comprising a rotatable member operably connected to said steering wheel and a control member detachably mounted over said rotatable member, a switch mounted on said structure for starting and stopping said electric motor, and detachable switch-operating means extending through said members and operably connected to said switch for actuating the same, said switch-operating means being detachable from said structure together with said control member.

9. In a power driven wheel chair having a chair body, traction wheels, a steering wheel, swingable driving means adapted to be positioned in and out of driving relation with said traction wheels, and an electric motor operably connected to said driving means; a rockable control comprising a supporting frame pivotally mounted on said body and operably connected to said driving means, a steering post rotatably mounted in said frame and operably connected to said steering wheel, an upright control column detachably mounted in telescopic engagement with said steering post, a switch mounted on said frame and electrically connected to said motor for starting and stopping the same, switch-operating means comprising an elongated member extending through said control column and steering post and having an operating handle at its upper end, and connecting linkage between the lower end of said member and said switch for operating the latter, said elongated member being detachable from said connecting linkage whereby to permit removal of said control column together with said switch-operating means.

10. A power driven wheel chair comprising a chair body, traction wheels mounted on said body, driving means for said wheels swingably mounted on said body and including a belt drive, braking means pivotally mounted adjacent said wheels for braking engagement therewith, and common control means rockably supported on said body and operatively connected to said driving means and to said braking means, said control means being rockable in one direction for positioning said driving means in driving relation with said wheels and for simultaneously tightening said belt drive, and said control means being rockable in the opposite direction for positioning said driving means out of driving relation with said wheels and for simultaneously engaging said braking means with said wheels.

11. A power driven wheel chair comprising a chair body, traction wheels mounted on said body, a power unit mounted on said body, drive shaft means swingably mounted on said body for movement into and out of driving relation with said wheels, belt means operatively connecting said power unit with said drive shaft means, brake members pivotally mounted adjacent said wheels for braking engagement therewith, and common control means rockably supported on said body and having separate linkages operatively connecting said control means with said drive shaft means and with said brake members, said control means being rockable in one direction for positioning said drive shaft means in driving relation with said wheels and simultaneously maintaining said belt means under proper driving tension and also simultaneously disengaging said brake members from said wheels, and said control means being rockable in the opposite direction for positioning said drive shaft means out of driving relation with said wheels and simultaneously engaging said brake members with said wheels.

KENNETH GINSTERBLUM.

REFERENCES CITED

The following references are of record in the file of this patent:

UNITED STATES PATENTS

| Number | Name | Date |
|---|---|---|
| 937,211 | Holsman | Oct. 19, 1909 |
| 987,728 | Liwentaal | Mar. 28, 1911 |
| 1,164,863 | Potter et al. | Dec. 21, 1915 |
| 1,429,213 | Gladish | Sept. 12, 1922 |
| 1,565,966 | Simpson | Dec. 15, 1925 |
| 1,667,933 | Hamel | May 1, 1928 |
| 1,711,224 | Stockfleth et al. | Apr. 30, 1929 |
| 2,054,644 | Wulfert | Sept. 15, 1936 |
| 2,192,468 | Gore | Mar. 5, 1940 |

FOREIGN PATENTS

| Number | Country | Date |
|---|---|---|
| 5,069 | Great Britain | Mar. 5, 1896 |
| 13,380 | Sweden | Nov. 30, 1901 |
| 166,017 | Great Britain | July 14, 1921 |

Certificate of Correction

Patent No. 2,567,065 September 4, 1951

KENNETH GINSTERBLUM

It is hereby certified that error appears in the printed specification of the above numbered patent requiring correction as follows:

Column 5, line 65, after "adjacent" insert *said traction*; column 6, line 56, for "swigably" read *swingably*;

and that the said Letters Patent should be read as corrected above, so that the same may conform to the record of the case in the Patent Office.

Signed and sealed this 18th day of December, A. D. 1951.

[SEAL]

THOMAS F. MURPHY,
*Assistant Commissioner of Patents.*